(12) United States Patent
Soloff

(10) Patent No.: US 6,814,824 B2
(45) Date of Patent: Nov. 9, 2004

(54) METHOD FOR VIBRATION WELDING FABRICS TO SUBSTRATES

(75) Inventor: Robert S. Soloff, Ridgefield, CT (US)

(73) Assignee: Sonics & Materials, Inc., Newtown, CT (US)

( * ) Notice: Subject to any disclaimer, the term of this patent is extended or adjusted under 35 U.S.C. 154(b) by 0 days.

(21) Appl. No.: 10/672,810

(22) Filed: Sep. 26, 2003

(65) Prior Publication Data

US 2004/0112502 A1 Jun. 17, 2004

Related U.S. Application Data

(60) Provisional application No. 60/413,875, filed on Sep. 26, 2002.

(51) Int. Cl.[7] ............................................. B29C 65/06
(52) U.S. Cl. ...................................... 156/73.5; 156/580
(58) Field of Search ........................ 156/72, 73.1, 73.5, 156/73.6, 196, 209, 219, 242, 580, 580.2; 264/68, 69

(56) References Cited

U.S. PATENT DOCUMENTS

| | | | |
|---|---|---|---|
| 5,026,445 A | | 6/1991 | Mainolfi et al. ............ 156/73.5 |
| 5,468,335 A | | 11/1995 | Mainolfi et al. .......... 156/580.2 |
| 5,705,003 A | * | 1/1998 | Farrow et al. .............. 156/73.5 |
| 5,931,729 A | * | 8/1999 | Penttila et al. ............... 451/532 |
| 6,001,202 A | * | 12/1999 | Penttila et al. ............. 156/73.5 |
| 6,033,505 A | * | 3/2000 | Sugiyama et al. ......... 156/73.5 |
| 6,066,217 A | | 5/2000 | Dibble et al. .............. 156/73.5 |
| 6,227,275 B1 | | 5/2001 | Dibble et al. ................ 156/580 |

* cited by examiner

*Primary Examiner*—James Sells
(74) *Attorney, Agent, or Firm*—St. Onge Steward, Johnston & Reens LLC.

(57) ABSTRACT

A fabric having a backing layer with a lower surface, at least a portion of the backing layer adjacent the lower surface being formed from a thermoplastic material, is provided. At least the lower surface of the backing layer is heated in order to soften the lower surface of the backing layer, and a die having a surface in which are formed a plurality of recesses is forced into the softened lower surface of the backing layer in order to create a plurality of raised areas protruding from the lower surface of the backing layer. The fabric is placed on the substrate so that the raised areas protruding from the lower surface of the backing layer are in intimate pressurized contact with the substrate at an interface thereof, and a vibration or orbital welding process is performed thereon to achieve a bond therebetween.

15 Claims, 5 Drawing Sheets

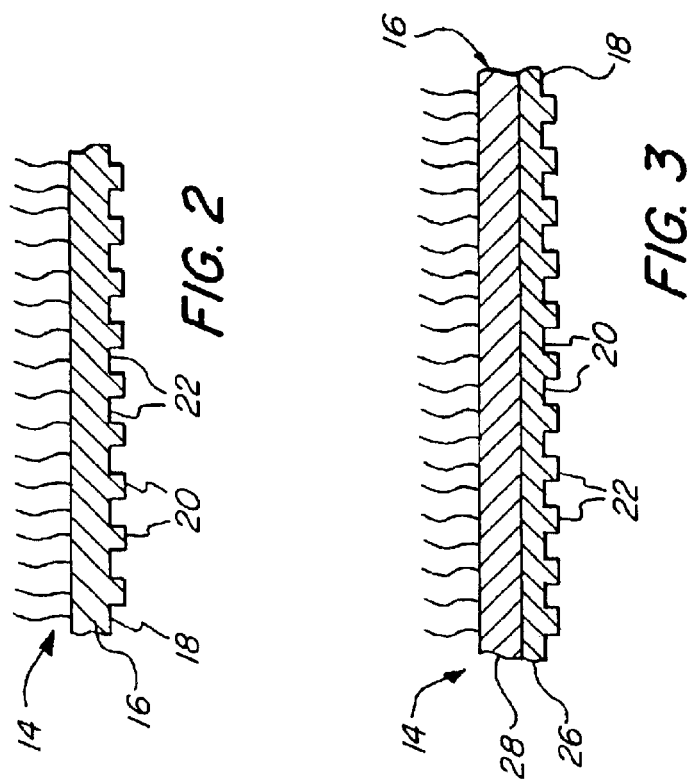
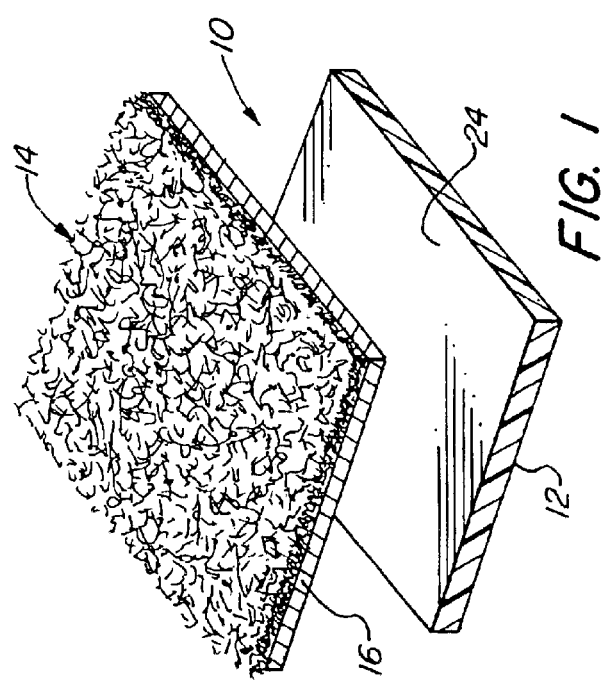

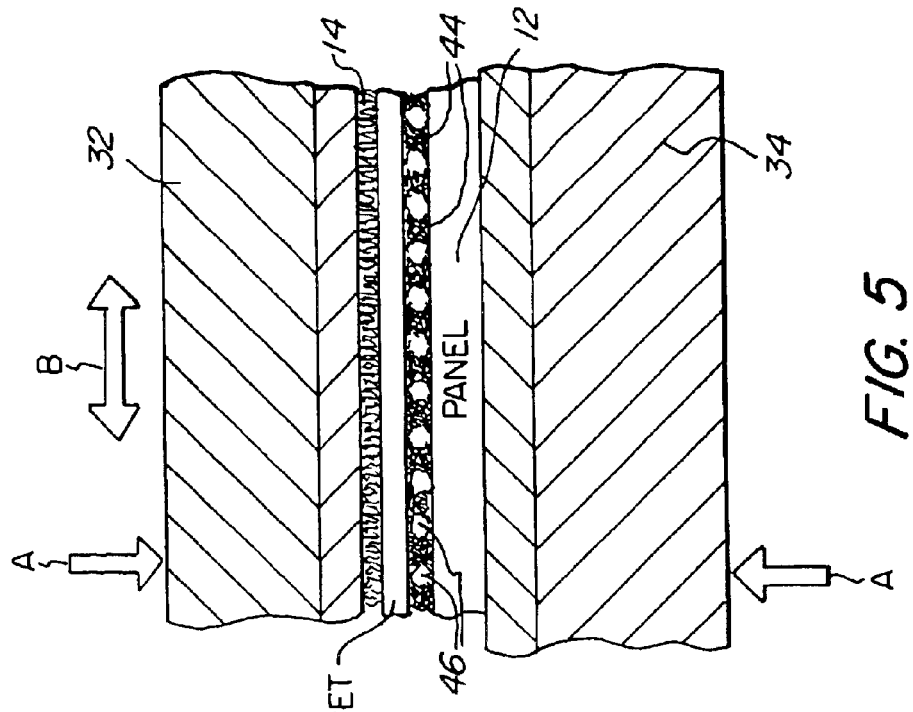
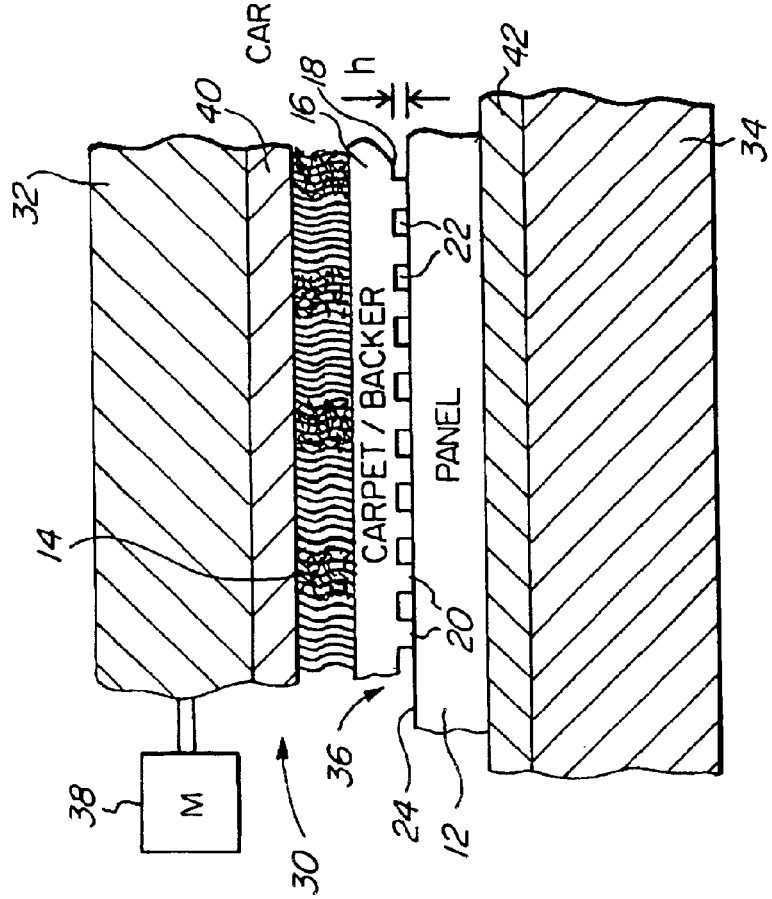

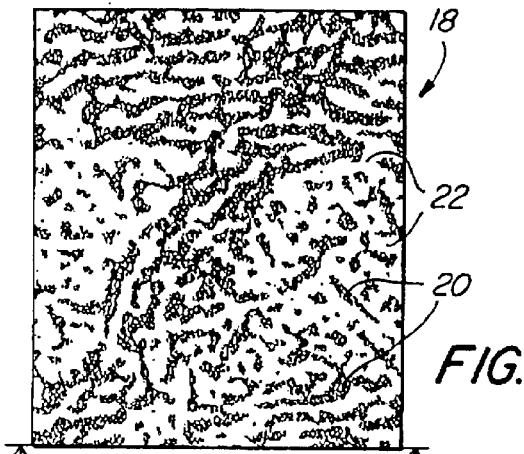
FIG. 7A
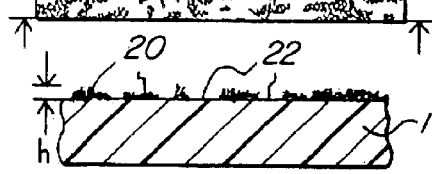
FIG. 7B
FIG. 8A
FIG. 9A
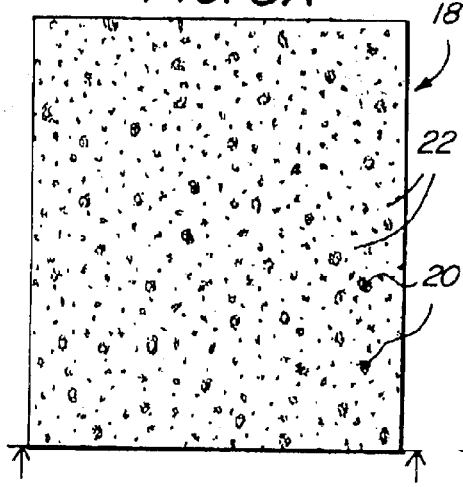
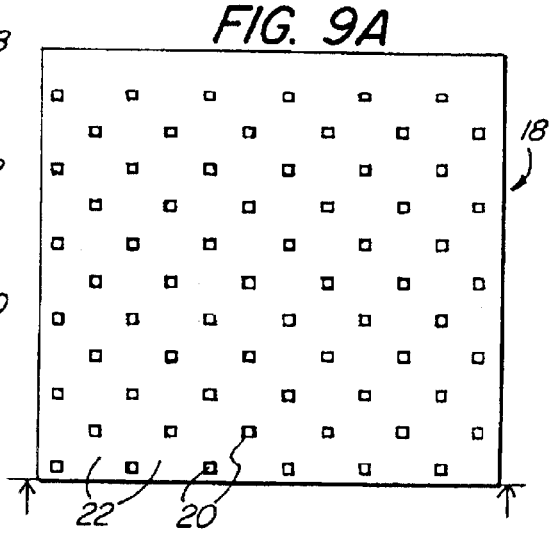
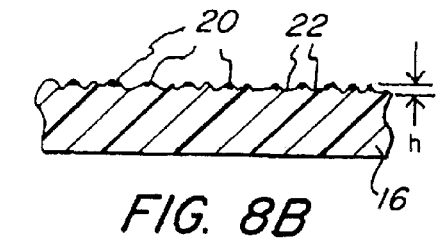
FIG. 8B
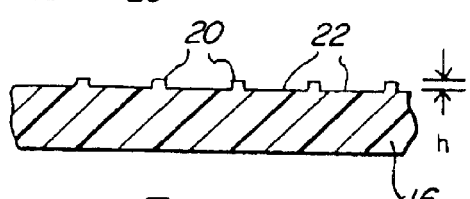
FIG. 9B

METHOD FOR VIBRATION WELDING FABRICS TO SUBSTRATES

RELATED APPLICATIONS

This patent application claims the benefit of, under Title 35, United States Code, Section 119(e), U.S. Provisional Patent Application No. 60/413,875, filed Sep. 26, 2002.

FIELD OF THE INVENTION

The present invention relates generally to the field of vibration welding fabrics to substrates, such as is the case with fabric covered panels. More particularly, the present invention is related to a method for manufacturing carpet/fabric panels without the use of energy directors such as carpet engaging pins.

BACKGROUND OF THE INVENTION

Many articles, such as automobile car door panels, typically are formed of a thermoplastic substrate that can be formed using injection molding, thermoforming, extrusion or vacuum forming. It is often desired to cover sections of this panel with another material such as a synthetic fiber carpet or a fabric or another material. This covering can be for aesthetic and/or functional purposes.

Traditional production processes used for bonding materials to door panels require additional consumables. These can include, but are not limited to, glue, staples, clips and other mechanical means. Such additional consumables tend to affect the re-cyclability of the thermoplastic substrates to which the carpet/fabrics are bonded, may not provide aesthetically pleasing results and may not provide adequate bonding or attachment.

Other known bonding processes include linear or orbital vibration welding. U.S. Pat. Nos. 5,026,445 and 5,468,335, for example, disclose a thermoplastic substrate and a synthetic fiber carpet bonded together by a vibration welder generating frictional heat at an interface between the substrate and an underlying carpet. Specifically, both U.S. Pat. Nos. 5,026,445 and 5,468,335 disclose the use of a platen having a pattern of closely spaced pins. These pins are capable of penetrating the loft of a carpet and serve as energy directors with which a backing layer of the carpet can be welded to the thermoplastic substrate at the regions opposite to the pins.

The above-mentioned patents disclose welding processes that make use of the fact that thermoplastics will remelt with the application of heat and then resolidify once the heating ceases. These processes do not require mechanical devices for the attachment of the pieces to be welded.

One of the difficulties incurred in using the above-described welding processes is that they require the carpet layer to be subjected to localized contact either with ultrasonic horns or engaging pins used in vibration welding as taught by U.S. Pat. Nos. 5,026,445 5,468,335. This localized contact, though indispensable for the disclosed processes, causes a marking or formation of telltale pin dents in the carpet welded to the plastic panel. To eliminate the dents it is then necessary to brush, comb or otherwise smooth out the effects of these processes upon the carpet surface. Another difficulty in using the welding apparatus described in these patent is that the manufacture of platens with pins involves an expense.

Other bonding processes have been developed which significantly improve on the processes disclosed in U.S. Pat. Nos. 5,026,445 and 5,468,335. These improved processes are set forth in U.S. Pat. Nos. 6,066,217 and 6,227,275, which are commonly owned with the present application, and which are fully incorporated by reference herein. One of the processes disclosed in U.S. Pat. Nos. 6,066,217 and 6,227,275 involves providing a thermoplastic substrate and a carpet with a thermoplastic backing. Either the substrate or the backing layer of the carpet is textured with a plurality of distributed tiny raised regions. Where these regions are positioned, bonding regions are formed at an interface between the backing layer and the substrate's outer surface, such preferential bonding regions being produced from the vibration welding. These bonding regions are widely distributed so as to form distinct and extensively distributed bonded zones. The result is a well bonded fabric.

However, while the above described process disclosed in U.S. Pat. Nos. 6,066,217 and 6,227,275 provides excellent results, there is no teaching as to how the raised regions provided on either the substrate or the backing layer are formed. The present invention is specifically directed to a novel method for forming the raised regions on the backing layer of the carpet. Moreover, as U.S. Pat. Nos. 6,066,217 and 6,227,275 teach that locating the raised regions on the substrate is preferred and only briefly mentions that the raised regions may be located on the backing layer, there is no suggestion of the below described novel method therein, and in fact the novel method could not be used in connection with the preferred arrangement disclosed in U.S. Pat. Nos. 6,066,217 and 6,227,275 wherein the raised regions are provided on the substrate.

SUMMARY OF THE INVENTION

With a vibration welding technique in accordance with the present invention there is no localized pin contact with the fabric and, therefore, there are no markings or pin dents to be removed or brushed out. The term fabric as used herein includes heavy fabrics such as carpets as well as lighter weight and thinner fabrics which, when used with this invention, are backed by a usually thicker backing layer. The fabric may be a woven or non-woven material.

With the welding of a fabric in accordance with the invention, the fabric is virtually unaffected from a visual standpoint and no further steps need to be taken to restore the appearance of the fabric.

Instead of relying upon the use of a fixture having a specified pin structure, with the pins selected to penetrate the piles of a carpet, to produce localized contact between the fabric and the substrate, both the substrate and the fabric are transformed so as to be a part of the welding structure. This is achieved with one method according to the invention by providing a flexible fabric having a backing layer and creating a plurality of distributed raised regions on the backing layer by heating the backing layer in order to soften it and then pressing a die into the backing layer to cause the portions of the softened backing layer to flow into recesses provided in the die to form the raised regions. The backing layer may be heated and pressed with the die in discrete steps, or in a single step where the die itself is heated. The die may comprise a calendaring roller having a continuous outer surface in which are provided the recesses. The backing layer may comprise a single thermoplastic layer of material or may comprise a plurality of layers of material joined together, at least the outermost layer being formed from a thermoplastic material. The raised regions may be uniformly sized, shaped and/or spaced or may be randomly sized, shaped and/or spaced.

The flexible fabric is disposed on the substrate so that the bottom surface backing layer (i.e., the surface with the raised regions) is in intimate pressurized contact with the substrate at an interface which extends over an effectively continuous and substantial portion of the bottom surface of the fabric.

The fabric and substrate are then displaced relative to one another while in intimate pressurized surface contact until the raised regions which are in contact with the substrate are softened to cause either an interpenetration or fusion of softened raised regions with the substrate. When the displacing step is stopped the softened zones harden and form a large number of distributed bonds between the fabric and the substrate.

With a method of this invention various materials can be vibration welded to a thermoplastic substrate. Thus the material can be a carpet which has a backing layer. The carpet can have regions (i.e. between the raised regions) that may not necessarily be fused with the substrate but because of the distributed nature of the raised regions, excellent bonding is achieved.

Because the entire surface of the backing layer is not required to be melted with a method of this invention, but rather only the localized areas of the raised regions are required to be melted, bonding can be achieved over a larger area with a lower input of energy. Similarly, higher clamping forces can be locally applied to the raised areas, thereby generating more localized heating at the welding interface. Moreover, a more even distribution of bonding is achieved because the energy is focused only on the raised regions of the backing layer. Furthermore, a wider variety of carpet materials can be welded since the backing layer can be independent of the fabric and can be compatible with the thermoplastic substrate.

The material can be a flexible fabric with a backing layer or even a vinyl layer with either sufficient thickness to be directly welded to the substrate or with an intermediate backing layer (so long as either the vinyl layer or the backing layer if one is provided has created thereon raised portions as described above). The term fabric as used herein, therefore, includes such materials as a heavy fabric or carpet, vinyl with a backing layer and other similar thin materials that can be directly vibration welded to thermoplastic substrates in accordance with the invention and in which raised portions can be formed using the method of the present invention.

When a fabric is vibration welded to a thermoplastic door panel a large selection of colors and patterns can be employed for an enhancement in the appearance of the door panel.

The scope of the present invention includes the method for vibration or orbital welding of a carpet/fabric to a three dimensionally contoured substrate such as commonly found on car door panels and the like. Such welding involves placing the substrate and fabric between a pair of similarly three dimensionally contoured platens whose active surfaces are substantially parallel and without pins. The term vibration welding as used herein includes orbital welding.

Another feature of the invention involves the use of tooling that can be more easily prepared for a vibration welding application. Thus with tooling in accordance with the invention upper and lower tools are provide with typically the lower tool being moveable to engage the upper tool with pressure while the substrate and fabric workpieces are between them. The lower tool has a workpiece engaging surface shaped to match that of the contour of the substrate workpiece. This surface is provided with an appropriate amount of friction to grip the fabric without slipping.

The lower tool is preferably segmented with segments having surfaces adapted to conform to the contour of the back of the substrate that is to be bonded to the fabric. The segments are adjustable so as to assure appropriate surface wide pressure contact for area wide bonding between the fabric and the thermoplastic substrate. If necessary, the contacting surfaces of the segments are provided with enhanced friction to avoid slipping of the substrate.

With vibration welding tools in accordance with the invention the use of pins as required by the prior art can thus be advantageously avoided.

It is therefore an object of this invention to provide an improved method for vibration welding of a fabric to a substrate while overcoming the drawbacks of the above-described prior art.

Another object of the invention is to provide a method of manufacturing soft material covered panels using vibration welding for bonding a carpet or other fabric to a thermoplastic substrate without damaging the decorative surface of the fabric.

Another object is the invention is to provide a vibration welding method for bonding an interstitial surface of a carpet having a backing layer with a thermoplastic substrate.

Still another object of the invention is to provide a vibration welding method for bonding a fabric having a thermoplastic substrate having raised regions formed thereon to a thermoplastic substrate surface.

Yet another object of the invention is to provide a suitable method for forming raised regions on the thermoplastic backing layer of a fabric.

Yet another object of the invention is to provide a tool for vibration welding of fabrics to thermoplastic substrates of different contours.

The invention and its particular features and advantages will become more apparent from the following detailed description considered with reference to the accompanying drawings.

BRIEF DESCRIPTION OF THE DRAWINGS

FIG. 1 is an exploded perspective view of a substrate and a fabric with a backing layer in the form of a carpet to be bonded according to the invention;

FIG. 2 is a partial sectional enlarged, out of scale, view of an embodiment of the fabric with a backing layer as shown in FIG. 1;

FIG. 3 is a partial sectional enlarged, out of scale, view of another embodiment of the fabric with a backing layer as shown in FIG. 1;

FIG. 4 is a partial sectional enlarged, out of scale, view of the vibration welder receiving the carpet and substrate as shown in FIG. 1;

FIG. 5 is the same view as FIG. 4 during a welding operation;

FIG. 7A is an explanatory plane view of a backing layer surface with the ratio of randomly scattered variously sized bonding areas versus nonbonding areas equal approximately 30% bonding to 70% nonbonding;

FIG. 7B is a cross-sectional view of the backing layer of FIG. 7A;

FIG. 8A is the same view as the one shown in FIG. 7A but with the ratio of randomly scattered variously sized bonding areas versus nonbonding areas equal approximately 50% bonding to 50% nonbonding;

FIG. 8B is a cross-sectional view of the backing layer shown in FIG. 8A;

FIG. 9A is an explanatory plane view of a more uniform distribution of raised areas versus depressed areas manufactured according to the invention;

FIG. 9B is a cross-sectional view of the backing layer shown in FIG. 9A;

DETAILED DESCRIPTION OF AN EMBODIMENT OF THE INVENTION

Figure 6:
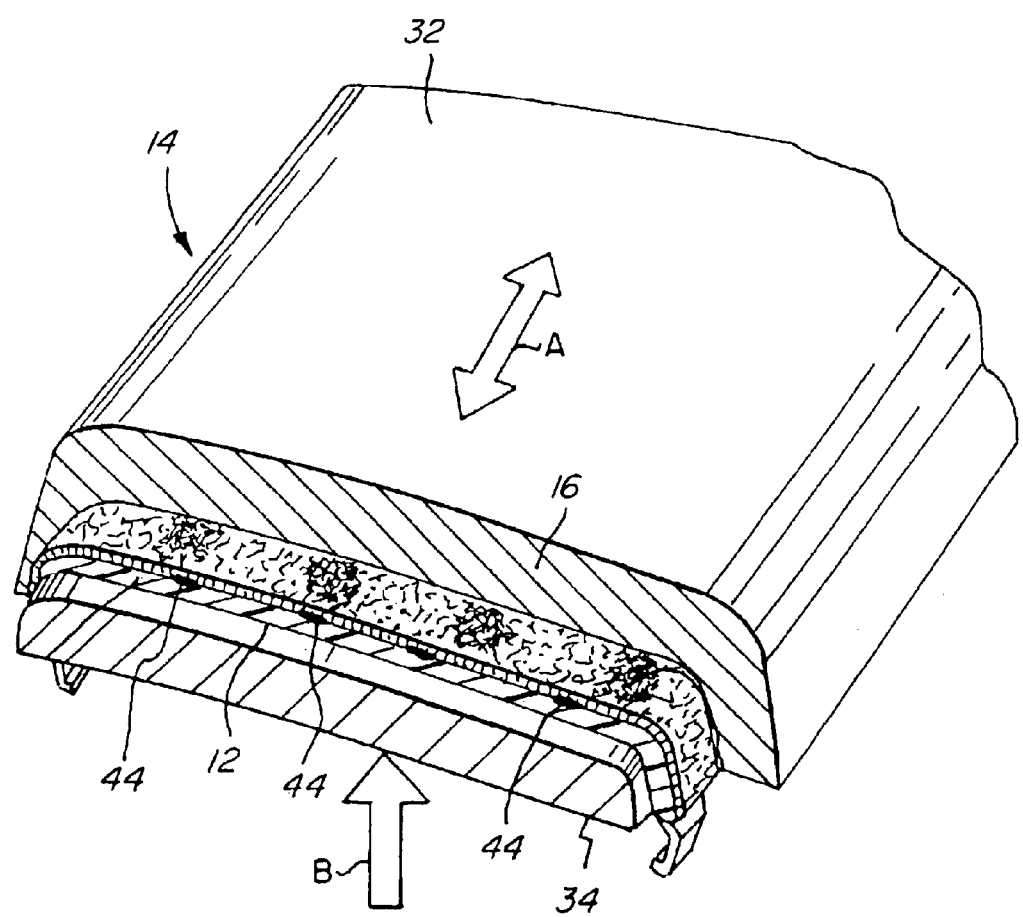
FIG. 6 is a perspective and partially broken away view of a welder implementing a method according to the invention.

With reference to FIGS. 1–3 an assembly 10 of a substrate 12 and a fabric in the form of a carpet 14 are conflated together in accordance with a method of this invention. The carpet 14 can be made of a mat, fleece or felt or other material each of which includes a backing layer 16. The backing layer 16 is provided with a textured lower surface 18 which has raised areas 20 and depressed areas 22. The lower surface 18 of backing layer 16 is placed in intimate contact with a smooth upper surface 24 of substrate 12, formed from a thermoplastic material, and is directly bonded thereto by means of a vibration welder, as described more fully below.

The backing layer 16 may be formed as a single layer (as shown in FIG. 2) or may be formed of multiple layers 26, 28 (as shown in FIG. 3), such as by coating a fabric material with an additional layer. When backing layer 16 comprises only a single layer of material, the entirety of backing layer 16 is formed from a thermoplastic material. However, when backing layer 16 is formed from multiple layers 26, 28 of material, all that is required is that the lowermost layer 26 (i.e., the one having textured lower surface 18) be formed from a thermoplastic material. The other layer or layers 28 may be formed from a thermoplastic material or some other type of material. Thus, a carpet having a backing layer not formed from a thermoplastic material may be used with the method of the present invention my coating the pre-existing backing layer with a thermoplastic layer thereby forming a multi-layered backing layer 16.

The technique of vibration welding is well known and typically involves pressing the carpet and substrate together between a pair of platens. At least the fabric engaging platen used with this invention is preferably prepared with enhanced friction to enable a firm gripping of the fabric. During pressurized contact between the carpet and the substrate, one of the platens, typically the upper platen, is moved for a pre-selected time to create heat from the frictional contact and thus a fusion or other bonding of portions of the contacting substrate and fabric surfaces.

This result is achieved by initially placing the lower surface 18 of the backing layer 16 of the carpet 14 proximate the smooth surface 24 of the substrate 12 as shown in FIG. 4. The carpet 14 and the substrate 12 are placed in an orbital or vibration welder 30 having platens 32, 34. These platens 32, 34 are displaceable relative to each other in a direction shown by arrow A. In this embodiment, for example, the lower platen 34 is displaceable toward the upper platen 32, though one could conceivably reverse this.

The carpet 14 is placed on the substrate 12, so that the raised areas 20 of the lower surface 18 of the backing layer 16 can be intimately pressed against the substrate surface 24 and form an interface 36 between these surfaces. The interface 36 extends over a substantial portion of the lower surface 18 of the backing layer 16.

Referring to FIG. 5, after either of the platens 32, 34 is displaced inwardly in a direction of the arrow A such that the substrate 12 and the backing layer 16 are in pressurized contact, a motor 38 applies translation motion to one of the platens, for example the upper platen 32 (indicated by double-headed arrow B), with either a vibration or orbital motion as is well known in the art. Active surfaces 40, 42 of the platens 32, 34 are generally parallel and may be substantially flat or three-dimensionally contoured and are not interrupted by pins or the like as disclosed in some of the aforementioned vibration welding patents.

The fibers in carpet 14 are collapsed and sufficient force is generated to cause a melting of the raised areas 20 to form a plurality of melted zones 44 generally corresponding to the locations of raised areas 20 where the backing layer 16 becomes welded to the substrate 12. The backing layer 16 thus acts as part of the welding apparatus in that it provides bonding zones 44 at the interface 36 where a fusion between the workpieces can be formed. After the vibration weld has been made and the assembly of the substrate 12 and attached carpet 14 are removed, the resilience in the fibers enables a self-restoration of the carpet fibers.

Thus, frictional heat generated at the interface 36 between the mating surfaces 18, 24 causes a softening of the backing layer's plastic material in the areas of the raised areas 20. Since the substrate, which is formed of a thermoplastic material, may also soften and flow in response to the dissipation of frictional heat, the carpet backing layer 16 and substrate 12 bond at the melted zones 44 of the interface 36 upon cooling.

The depressed areas 22 of the backing layer 16 generate little or no frictional heat, such that little or no melting occurs in these areas. As a result, the interface 36 between the surfaces 18, 24 has a plurality of zones 46 which provide either a weaker bond between the surfaces 18, 24 than the zones 44 do or show no bond at all.

After the vibration welding has caused a fusion or an interpenetration of backing layer 16 at the raised areas 20, usually in a short time of the order of a few seconds, the motion is stopped. Upon cessation of the relative motion between the substrate 12 and carpet 14 a cooling takes place resulting in hardening of the zones 44 and thus the formations of a plurality of bonded regions corresponding to the raised areas of the backing layer 16.

The platen generally parallel facing active surfaces 40, 42 should be capable of gripping the carpet 14 and substrate 12 respectively with sufficiently high friction to cause a bonding at the interface 36. This can be achieved by covering facing active surfaces 40, 42, or one of them, with friction enhancing surfaces (not shown) which, in turn, contacts the carpet 14 and substrate 12. The friction enhancing surfaces may be an integral part of the platens 20, 22 such as by preparing surfaces 40, 42 with a plasma coating of a grit with the desired roughness. Alternatively separate mounted layers of sand paper or emery cloth are placed on surfaces 40, 42. In most cases treatment of only the surface 40 in contact with the carpet 14 is needed.

The friction enhancing material treatment on surfaces 40, 42 preferably is a plasma place grit having a roughness equivalent to that of a sand paper having a roughness between 80 to about 120 gauge. Alternately, the layers 40, 42 can be covered with or formed of a material such as rubber, urethane, a textured metal surface or even an emery or sand paper layer like material as is commonly used in vibration welding of plastic pieces. The shape of the contacting surfaces of the layers 40, 42 may be configured to be flat or contoured, depending upon the shape of the substrate and carpet shapes to be bonded. It is preferred that the contour of the platen facing active surfaces 40, 42 conform to the shape of the portion of the substrate 12 to which the fabric 14 is to be bonded.

The upper platen 32 and its active surface 40 are used to provide intimate support for the carpet 14 to be welded. This platen 32 has the ability to not only support but also to be adjustable to provide locally differing forced engagement pressures in those areas of the application requiring such pressure differences. The requirement for this adjustability is to compensate for vibration welding of the substrate 12 to a carpet 14. These adjustable areas can be either "static" requiring the addition or removal of shims or spacers, or "dynamic", which will respond to externally initiated input.

The lower platen 34 and its active surface 42 are used to provide intimate support for the substrate 12 to which the carpet 14 is to be welded. This platen 34 will have the ability to not only support but also to be adjustable to provide locally differing forced engagement pressures in those areas of the application requiring such pressure differences. The requirement for this adjustability is to compensate for vibration that occurs in the bonding of the substrate 12 to the carpet 14. These adjustable areas can be either "static" requiring the addition or removal of shims or spacers, or "dynamic", which will respond to externally initiated input.

The thermoplastic substrate 12 may comprise a material commonly used for interior car door panels and is preferably made of ABS, blends of ABS, polypropylene or any other material having thermoplastic characteristics. The substrate 12 may be formed by injection molding, thermoforming, extrusion or vacuum forming and be utilized as a part of carpeted interior parts of a vehicle, thus having a variety of forms and shapes.

The invention, however, is not limited to the interior of a vehicle and a method according to the invention can be used to weld carpet or fabric to substrates for different purposes and industries as well. Although the substrate 12 as shown in FIG. 1 has a planar substrate face 24, this face may have a three-dimensional contoured shape, as usually is the case with a carpeted interior of a vehicle for its armrests, doors and the like as will be explained below.

The fibers of carpet 14 may be formed from a thermoplastic material or of any of natural, regenerated fibers, cellulose acetate fibers, semi-synthetic, synthetic, or mineral fibers or mixtures of two or more of the above mentioned types of fibers. Natural fibers may be, for example, linen, jute and cotton. Regenerated fibers may include, for example, rayon. Semi-synthetic fibers may be cellulose acetate fibers, whereas synthetic fibers include nylon, polyacrylic and polyolefin. Mineral fibers may be made of glass.

FIG. 6 illustrates the manufacturing of an automobile door handle according to a method of the invention. A three dimensionally contoured substrate 12 is placed on an active surface one of a pair of platens 32, 34. The platens 32, 34 are similarly shaped to the three dimensionally contoured substrate 12, so that active surfaces of these platens 32, 34 are effectively parallel to one another.

After the backing layer 16 of a fabric 14 and the substrate 12 are brought in intimate pressurized contact due to displacement of the platen 34 in a direction of arrow B, the platens 32, 34 are displaced relative to one another in a direction of arrow A. This relative motion of the platens generates frictional heat at an interface between the backing layer 16 of the fabric 14 and the substrate 12 sufficient to soften regions 44 of the backing layer 16 which are juxtaposed with the plurality of raised regions 20 of the backing layer 16.

After ceasing the relative displacement of the platens and cooling of the melted areas, regions 44 become solidified, thereby creating bonds between the fabric and the substrate.

FIGS. 7A and 7B depict a random scatter of raised areas 20 and depressed areas 22 formed is the lower surface 18 of backing layer 16. In this case the ratio of the raised areas 20 to depressed areas 22 is approximately 30% raised areas 20 to 70% depressed areas 22. The height, h, of raised areas 20 relative to the adjacent depressed areas 22 is preferably in the range of about 0.003 inch to 0.065 inch, as is seen in FIG. 7B, although the height, h, can be higher or lower depending upon the specific carpet welding application.

FIGS. 8A and 8B depict a random scatter of the raised areas 20 and depressed areas 22 formed is the lower surface 18 of backing layer 16. In this case the ratio of the raised areas 20 to depressed areas 22 is approximately 50% raised areas 20 to 50% depressed areas 22. It is easy to see on FIG. 8B that distribution of the raised areas 20 is more uniform than in the embodiment shown in FIGS. 7A and 7B. The height, h, of raised areas 20 relative to the adjacent depressed areas 22 is generally the same as in FIGS. 7A and 7B.

While FIGS. 7A, 7B, 8A and 8B show a random scatter of the raised areas 20, it is possible to manufacture backing layers 16 according to the invention with a uniform distribution of these regions. For example, raised regions 20 may also be distributed in rows, or on a bias, or in circles. According to the invention, the carpeted 14 including such backing layers 16 with the patterned raised areas 20 may have a plurality of raised areas 20 forming a continuous ridge or a plurality of intersecting rows or ridges. The lower face of these raised areas 20 on the lower surface 18 of backing layer 16 may be flat, curved or pointed.

As an example, FIGS. 9A and 9B illustrate a uniform distribution of bonding areas corresponding to a plurality of uniformly distributed raised areas 20 which are formed on a the lower surface 18 of backing layer 16. The height of these raised areas 20 is the same as in the previous examples. The raised areas are preferably spaced, center to center, by a distance of about 0.005 inch to 0.5 inch, although the height distance can be greater or lesser depending upon the specific carpet welding application and the height, h, of the raised areas 20.

Figure 10:
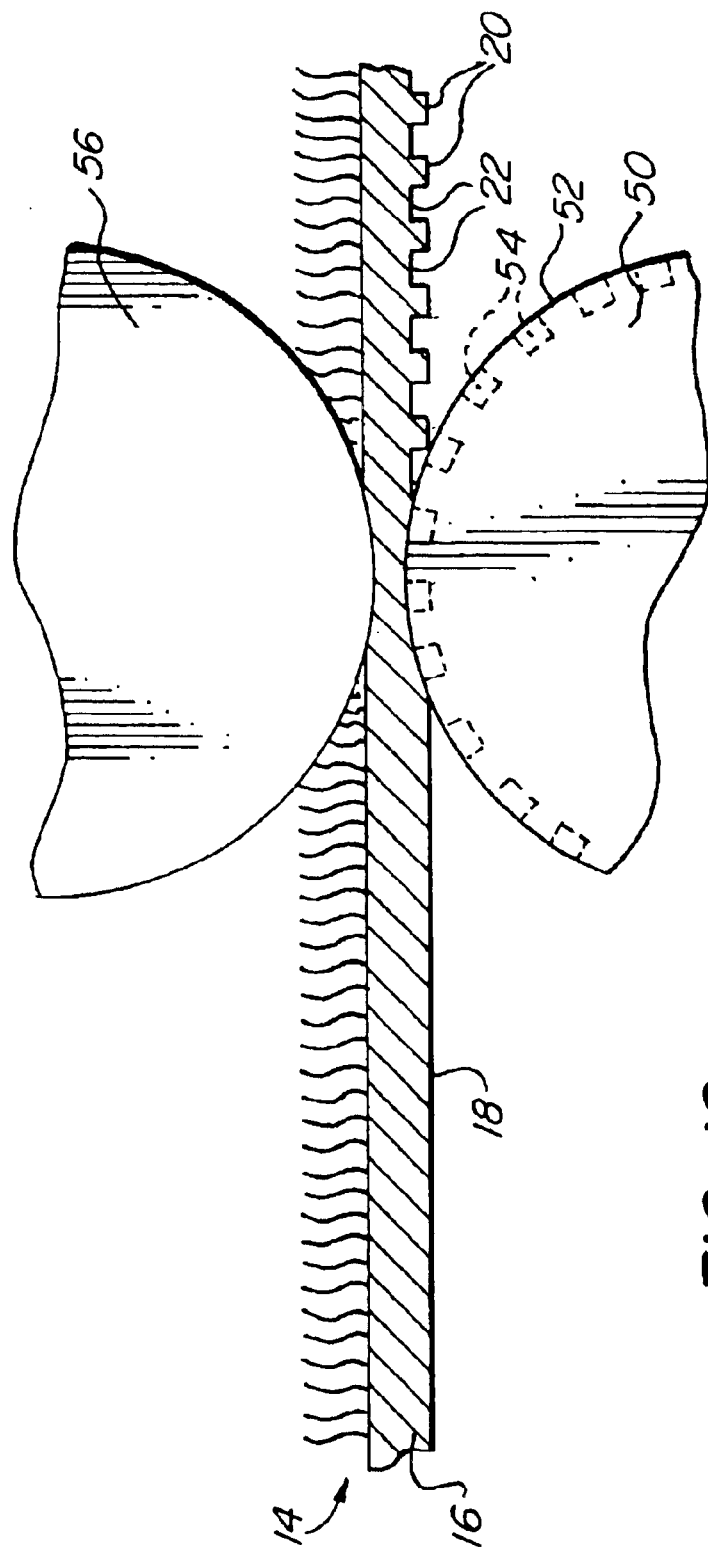
FIG. 10 is a partial side section and broken away view of one tooling in accordance with the invention to create raised areas in the backing layer of a fabric.

Referring now to FIG. 10, a tooling in accordance with the invention to create raised areas 20 in the backing layer 16 of a carpet 14 is shown. According to the present invention, formation of raised areas 20 is achieved by providing a backing layer 16 having a lower surface 18. As discussed above, backing layer 16 may be formed as a single layer (as shown in FIG. 2) or may be formed of multiple layers 26, 28 (as shown in FIG. 3), such as by coating a fabric material with an additional layer. When backing layer 16 comprises only a single layer of material, the entirety of backing layer 16 is formed from a thermoplastic material. However, when backing layer 16 is formed from multiple layers 26, 28 of material, all that is required is that the lowermost layer 26 (i.e., the one having textured lower surface 18) be formed from a thermoplastic material. The other layer or layers 28 may be formed from a thermoplastic material or some other type of material. A die 50 is also provided, the die 50 having a surface 52 having a plurality of spaced apart recesses 54 therein.

The backing layer 16, or at least the lower surface 18 thereof is heated in order to soften it and then the die 50 is forced against the softened lower surface 18 of backing layer 16 to cause portions of the softened backing layer 16 to flow into the recesses 54 in the die 52 to form the raised regions 20. The portions of backing layer 16 which contact the surface 52 of the die 50 located between the recesses 54 therein will form depressed areas 22. The lower surface 18 of the backing layer 16 may be heated and before the die 50 is forced thereagainst in discrete steps, or in a single step where the die 50 itself is heated. The die 50 may comprise a calendaring roller having a continuous outer surface 52 in which are provided the recesses 54. In this case, a roller anvil 56 is preferably also provided such that carpet 14 is passed between the die 50 and the anvil 56 under pressure.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for vibration welding or orbital welding of a fabric to a thermoplastic substrate, said method comprising the steps of:
    providing a fabric having a backing layer with a lower surface, at least a portion of the backing layer adjacent the lower surface being formed from a thermoplastic material;
    heating at least the lower surface of the backing layer in order to soften the lower surface of the backing layer;
    forcing a die having a surface in which are formed a plurality of recesses into the softened lower surface of the backing layer in order to create a plurality of raised areas protruding from the lower surface of the backing layer;
    placing the fabric on the substrate so that the raised areas protruding from the lower surface of the backing layer are in intimate pressurized contact with the substrate at an interface thereof;
    displacing the fabric and substrate relative to one another while in intimate and sufficiently pressurized surface contact with each other to soften at least the raised areas to cause an interpenetration of the raised areas by juxtaposed regions of the substrate; and
    ceasing the relative displacing step to allow the softened raised regions to cool and enable the formation of distributed bonded regions between the backing layer over at least a substantial portion of the interface of the substrate.

2. The method of claim 1 wherein said heating and forcing steps are performed simultaneously by a heated die.

3. The method of claim 1 wherein the die comprises a calendaring die, wherein a corresponding roller anvil is provided, and wherein said forcing step comprises the step of passing the fabric between the die and the anvil under pressure.

4. The method of claim 1 wherein the raised areas are uniformly distributed over the lower surface of the backing layer.

5. The method of claim 4 wherein the raised areas are spaced, center to center, by a distance of at least about 0.005.

6. The method of claim 5 wherein the raised areas are spaced, center to center, by a distance of about 0.005 inch to about 0.5 inch.

7. The method of claim 1 wherein the raised areas are randomly distributed over the lower surface of the backing layer.

8. The method of claim 1 wherein the raised areas project about 0.003 inch to about 0.065 inch above adjacent depressed zones.

9. A method for vibration welding or orbital welding of a fabric to a thermoplastic substrate, said method comprising the steps of:
    providing a fabric having a backing layer with a lower surface, at least a portion of the backing layer adjacent the lower surface being formed from a thermoplastic material;
    providing a heated die having a surface in which are formed a plurality of recesses;
    forcing the heated die into the lower surface of the backing layer in order to soften the lower surface of the backing layer and to cause portions of the softened lower surface of the backing layer to flow into the recesses of the die in order to create a plurality of raised areas protruding from the lower surface of the backing layer;
    placing the fabric on the substrate so that the raised areas protruding from the lower surface of the backing layer are in intimate pressurized contact with the substrate at an interface thereof;
    displacing the fabric and substrate relative to one another while in intimate and sufficiently pressurized surface contact with each other to soften at least the raised areas to cause an interpenetration of the raised areas by juxtaposed regions of the substrate; and
    ceasing the relative displacing step to allow the softened raised regions to cool and enable the formation of distributed bonded regions between the backing layer over at least a substantial portion of the interface of the substrate.

10. The method of claim 9 wherein the die comprises a calendaring die, wherein a corresponding roller anvil is provided, and wherein said forcing step comprises the step of passing the fabric between the die and the anvil under pressure.

11. The method of claim 9 wherein the raised areas are uniformly distributed over the lower surface of the backing layer.

12. The method of claim 11 wherein the raised areas are spaced, center to center, by a distance of at least about 0.005.

13. The method of claim 12 wherein the raised areas are spaced, center to center, by a distance of about 0.005 inch to about 0.5 inch.

14. The method of claim 9 wherein the raised areas are randomly distributed over the lower surface of the backing layer.

15. The method of claim 9 wherein the raised areas project about 0.003 inch to about 0.065 inch above adjacent depressed zones.

* * * * *